(12) United States Patent
Vanderveen et al.

(10) Patent No.: US 8,881,992 B2
(45) Date of Patent: Nov. 11, 2014

(54) HYDRAULIC HEATER VALVE

(75) Inventors: John Scott Vanderveen, Galesburg, MI (US); Samuel C. Sayles, Portage, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 824 days.

(21) Appl. No.: 13/072,850

(22) Filed: Mar. 28, 2011

(65) Prior Publication Data

US 2011/0272036 A1 Nov. 10, 2011

Related U.S. Application Data

(60) Provisional application No. 61/332,894, filed on May 10, 2010.

(51) Int. Cl.
*G05D 23/185* (2006.01)
*G05D 23/13* (2006.01)
*G05D 23/02* (2006.01)
*F16K 49/00* (2006.01)
*F16K 11/07* (2006.01)
*F16K 17/04* (2006.01)
*F16K 17/06* (2006.01)
*G05D 23/08* (2006.01)

(52) U.S. Cl.
CPC ............ *F16K 49/00* (2013.01); *F16K 11/0704* (2013.01); *F16K 11/0716* (2013.01); *F16K 17/048* (2013.01); *F16K 17/065* (2013.01); *G05D 23/08* (2013.01)
USPC ................... 236/92 C; 236/12.11; 236/12.16; 236/12.18; 236/12.23

(58) Field of Classification Search
CPC ... F16K 17/003; F16K 31/002; G05D 23/022; G05D 23/185
USPC ................ 236/92 R, 92 C, 92 D, 101 A, 24.5
See application file for complete search history.

(56) References Cited

U.S. PATENT DOCUMENTS

| | | | | |
|---|---|---|---|---|
| 1,972,170 A | * | 9/1934 | Spencer | 236/92 C |
| 3,378,079 A | * | 4/1968 | Page, Jr | 166/129 |
| 3,575,342 A | * | 4/1971 | Puster | 236/34 |
| 3,783,693 A | | 1/1974 | Paros | |
| 3,920,035 A | * | 11/1975 | Werner | 137/115.05 |
| 4,078,722 A | * | 3/1978 | Luckenbill | 236/92 C |
| 4,344,564 A | * | 8/1982 | Magnuson | 236/34.5 |
| 4,354,345 A | * | 10/1982 | Dreisbach et al. | 60/39.08 |
| 4,454,982 A | * | 6/1984 | Reick et al. | 236/92 R |
| 4,489,883 A | * | 12/1984 | Anderson | 236/92 C |
| 4,570,851 A | * | 2/1986 | Cirillo | 236/93 R |
| 4,634,213 A | | 1/1987 | Larsson et al. | |
| 5,228,618 A | * | 7/1993 | Afshar | 236/34.5 |

(Continued)

*Primary Examiner* — Alexandra Elve
*Assistant Examiner* — Henry Crenshaw
(74) *Attorney, Agent, or Firm* — Renner, Otto, Boisselle & Sklar, LLP (57) ABSTRACT

Provided is a valve assembly having a thermal valve member and a priority valve member that are shiftable to first and second positions in response to a temperature and pressure of a fluid flowing through the valve assembly. Consequently, the valve can provide for flow through a heating orifice under low temperature, high pressure conditions so that pressure drops in fluid lines coupled to the valve assembly may be prevented or reduced, allowing fluid lines with small diameters to be used in an aircraft or other fluid flow system, thereby reducing the weight of the aircraft or fluid flow system.

16 Claims, 5 Drawing Sheets

(56) References Cited

U.S. PATENT DOCUMENTS

| | | | |
|---|---|---|---|
| RE35,040 E * | 9/1995 | DuBois | 236/92 C |
| 5,873,518 A * | 2/1999 | Richmond et al. | 236/12.12 |
| 6,253,837 B1 * | 7/2001 | Seiler et al. | 165/103 |
| 6,536,464 B1 | 3/2003 | Lum et al. | |
| 6,935,569 B2 * | 8/2005 | Brown et al. | 236/34.5 |
| 6,994,102 B2 * | 2/2006 | Yamaguchi et al. | 137/115.13 |
| 7,316,227 B2 | 1/2008 | Zhao et al. | |
| 7,607,285 B2 * | 10/2009 | Futa et al. | 60/39.281 |
| 7,735,546 B2 * | 6/2010 | Bird et al. | 165/297 |
| 7,946,506 B2 * | 5/2011 | Zagni et al. | 236/101 R |
| 8,245,946 B2 * | 8/2012 | Greenthal et al. | 236/12.13 |
| 2007/0290058 A1 * | 12/2007 | Guterman | 236/93 R |
| 2008/0121282 A1 * | 5/2008 | Green et al. | 137/3 |
| 2008/0191043 A1 * | 8/2008 | Goncze | 236/12.11 |
| 2009/0007975 A1 | 1/2009 | Lum et al. | |

* cited by examiner

HYDRAULIC HEATER VALVE

RELATED APPLICATIONS

This application claims the benefit of U.S. Provisional Application No. 61/332,894 filed May 10, 2010, which is hereby incorporated herein by reference.

FIELD OF THE INVENTION

The present invention relates generally to a valve assembly, and more particularly to a hydraulic valve assembly responsive to temperature and/or pressure.

BACKGROUND OF THE INVENTION

Thermal actuators, such as wax motors, may be provided to convert temperature change into a force. Upon heating the thermal actuator, fluid disposed in the actuator is expanded, which causes a diaphragm to deform, thereby causing an axial movement of a piston adjacent the diaphragm. When the fluid is cooled, the fluid is contracted, which causes the diaphragm to return to its original state. Thermal actuators may be used in valves to open and close flow passages inside the valves. To minimize pressure drops caused by the thermal actuators, large diameter fluid tubes may be used.

SUMMARY OF THE INVENTION

The present invention provides a valve assembly having a thermal valve member and a priority valve member that are shiftable to first and second positions in response to a temperature and pressure of a fluid flowing through the valve assembly. Consequently, the valve can provide for flow through a heating orifice under low temperature, high pressure conditions so that pressure drops in fluid lines coupled to the valve assembly may be prevented or reduced, allowing fluid lines with small diameters to be used in an aircraft or other fluid flow system, thereby reducing the weight of the aircraft or fluid flow system.

In particular, the valve assembly includes a housing having an inlet for receiving fluid and first and second outlets for delivering the fluid from the valve assembly and thermal and priority valve members shiftable in the housing. The thermal valve member is shiftable by first and second springs between a first position permitting fluid flow from the inlet to the priority valve member and a second position blocking fluid flow, at least one of the springs being responsive to temperature changes of the fluid flowing through the housing. The priority valve member is shiftable against a biasing force by pressure at the inlet above a predetermined pressure, the priority valve member being shiftable between a first position blocking flow from the inlet to the second outlet and a second position permitting flow.

Preferably, the first and second springs shift the thermal valve member to the first position when the fluid is below a predetermined temperature and to the second position when the fluid is above the predetermined temperature.

The priority valve member is shifted to the first position when the pressure of the fluid is below the predetermined pressure and to the second position when the pressure is above the predetermined pressure.

The valve assembly includes a sleeve disposed in the housing that guides the thermal and priority valve members, wherein the sleeve includes a first opening for receiving fluid from the thermal valve member when the thermal valve member is in the first position, a second opening communicating with the first opening, a third opening communicating with the second opening, and an annulus communicating with the first and second openings.

The thermal valve member includes a first opening for receiving fluid and a second opening for delivering fluid to the first opening in the sleeve when the thermal valve member is in the first position.

The priority valve member includes an annulus communicating with the second and third openings in the sleeve when the priority valve member is in the second position.

According to another aspect of the invention, a method of delivering fluid through a valve assembly is provided, the valve assembly including a housing and thermal and priority valve members shiftable in the housing, wherein the thermal valve member is balanced by first and second springs, and wherein at least one of the springs is responsive to temperature changes of the fluid flowing through the housing. The method includes receiving fluid at an inlet of the housing, delivering the fluid to a first outlet of the housing, and delivering the fluid to a second outlet of the housing when the fluid has a temperature below a predetermined temperature and a pressure above a predetermined pressure.

The foregoing and other features of the invention are hereinafter described in greater detail with reference to the accompanying drawings.

DETAILED DESCRIPTION

The principles of the present invention have particular application to valve assemblies used on airplanes, such as at the wing tips or at the tip of the tail, to heat fluid flowing through the valve assemblies to allow fluid circulation without creating a large pressure drop. It will of course be appreciated, and also understood, that the principles of the invention may be useful in other applications including hydraulic pumps, heat exchangers, etc.

Figure 1:
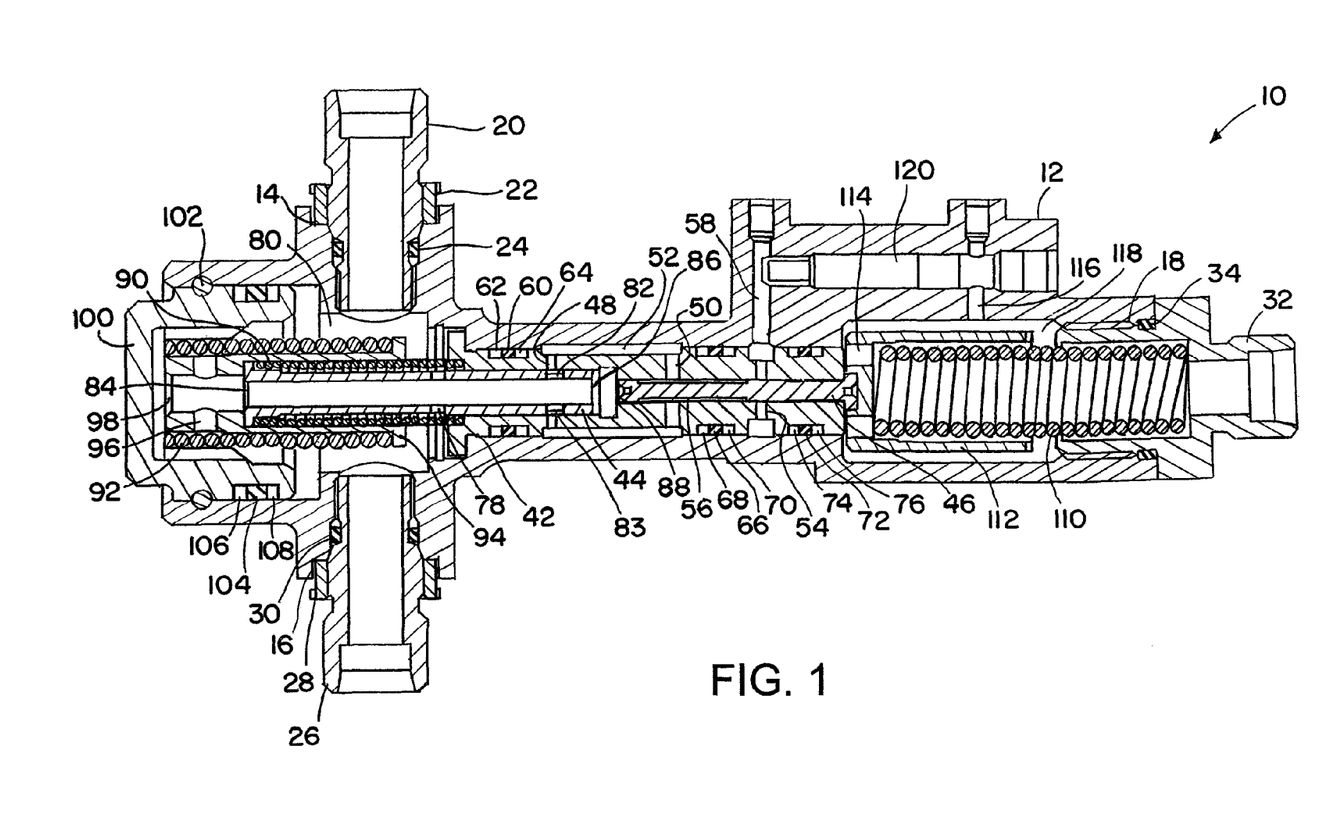
FIG. 1 is a cross-section view of an exemplary heater valve according to the invention, where a thermal spool and a priority spool are both in a first position.

Referring now in detail to the drawings and initially to FIG. 1, an exemplary heater valve 10 is shown. The heater valve includes a valve housing 12 having an inlet 14, a first outlet 16 and a second outlet 18. The inlet 14 is configured to receive an inlet port 20, which is secured to the housing by any suitable means, such as by threads, and sealed by a suitable seal, such as o-ring 24. It will be appreciated, however, that the inlet port may be formed integrally with the housing. A locking ring 22 disposed around the inlet port 20 is provided to prevent loosening of the inlet port, and the locking ring may be secured to the housing by any suitable means, such as by threads. The inlet port 20 may be coupled to a supply line to receive fluid, such as high pressure hydraulic fluid from the supply line. Alternatively, the supply line may be directly coupled to the inlet.

The first outlet 16 is configured to receive a first outlet port 26, which is secured to the housing by any suitable means, such as by threads, and sealed by a suitable seal, such as o-ring 30. It will be appreciated, however, that the first outlet port may be formed integrally with the housing. A locking ring 28 disposed around the outlet port 26 is provided to prevent loosening of the outlet port, and the locking ring may be secured to the housing by any suitable means, such as by threads. The first outlet port 26 receives fluid from the inlet port and may be coupled to a distribution line to deliver the fluid downstream of the valve 10. Alternatively, the distribution line may be directly coupled to the first outlet. The second outlet 18 is configured to receive a second outlet port 32, which is secured to the housing by any suitable means, such as by threads, and sealed by a suitable seal, such as o-ring 34. It will be appreciated, however, that the second outlet port may be formed integrally with the housing. The second outlet port 32 is configured to receive fluid from the inlet port and may be coupled to a fluid reservoir to deliver the fluid to the reservoir. Alternatively, the fluid reservoir may be directly coupled to the second outlet.

The valve 10 also includes a sleeve 42 assembled in the housing, which may alternatively be integrally formed with the housing, a thermal valve member 44 and a priority valve member 46, the valve members being preferably in the form of spools guided in the sleeve and will herein be described as such. The sleeve 42 includes first openings 48 and second openings 50 connected by an annulus 52 and third openings 54 configured to communicate with an annulus 56 of the priority spool 46 and with a flow passage 58 in the housing. The sleeve is sealed to an inner wall of the housing 10 by suitable seals, such as o-ring 60 and back-up rings 62 and 64 at an upstream end of the sleeve, o-ring 66 and back-up rings 68 and 70 downstream of o-ring 60, and o-ring 72 and back-up rings 74 and 76 downstream of o-ring 66. The thermal spool 44 includes first openings 78 communicating with a passage 80 between the inlet and the first outlet, second openings 82 communicating with an annulus 83 on an outside of the thermal spool that communicates with the first openings 48 in the sleeve 42 when the thermal spool is in a first position, and a third opening 84 on a first end for receiving fluid. The thermal spool 44 also includes a hollow bore 86 allowing fluid to flow out of a second end of the thermal spool 44 to contact a pressure surface 88 of the priority spool 46, which may be an end face. The pressure acting on the end face 88 can shift the priority spool 46 to a second position.

The thermal spool 44 is balanced by first and second springs 90 and 92, which oppose one another and which may be concentrically arranged. The first spring 90 may be any suitable spring, such as a corrosion-resistant steel spring and the second spring 92 may be any suitable spring responsive to temperature changes of the fluid flowing through the housing, such as a nickel titanium (nitinol) spring. Alternatively, the first spring or both the first and second springs may be nickel titanium springs responsive to different temperatures.

The first spring 90 surrounds the thermal spool 44 and is interposed between a lip on the first end of the thermal spool 44 and an end wall of a counterbore of the sleeve 42. The second spring 92 surrounds a thermal spring seat 94, which has openings 96 and an opening 98 on a first end for receiving fluid. The second spring 90 is interposed between an end wall of a counterbore of a cap 100 and a lip of the spring seat 94. When the valve 10 is assembled, the sleeve 42, thermal spool 44 and priority spool 46 are inserted into the housing on a first side of the housing, with the spring 90 surrounding the thermal spool, and the thermal spring seat 94 is inserted over the thermal spool 44 so that a first end of the thermal spool abuts an end wall of a counterbore of the spring seat 94. Alternatively, the priority spool can be inserted from a second side of the housing separately from the thermal spool and the sleeve. The cap 100 is then secured to the housing 12 by any suitable means, such as by retainer wire 102, to hold the thermal spool 44, spring 92 and spring seat 94 in place. The cap 100 is sealed to an inner wall of the housing 12 by suitable seals, such as o-ring 104 and back-up rings 106 and 108.

The valve 10 also includes a third spring 110 biasing the priority spool in a first position, which as illustrated is a closed position. The spring 110 may be any suitable spring, such as a corrosion-resistant steel spring or a nickel titanium spring. The spring 110 is interposed between an end wall of a counterbore of a priority spring seat 112 and an end wall of a counterbore of the second outlet port 32. The spring seat 112 includes openings 114 on a first end for receiving fluid that flows from a passage 116 to a passage 118 in the housing.

Figure 2:
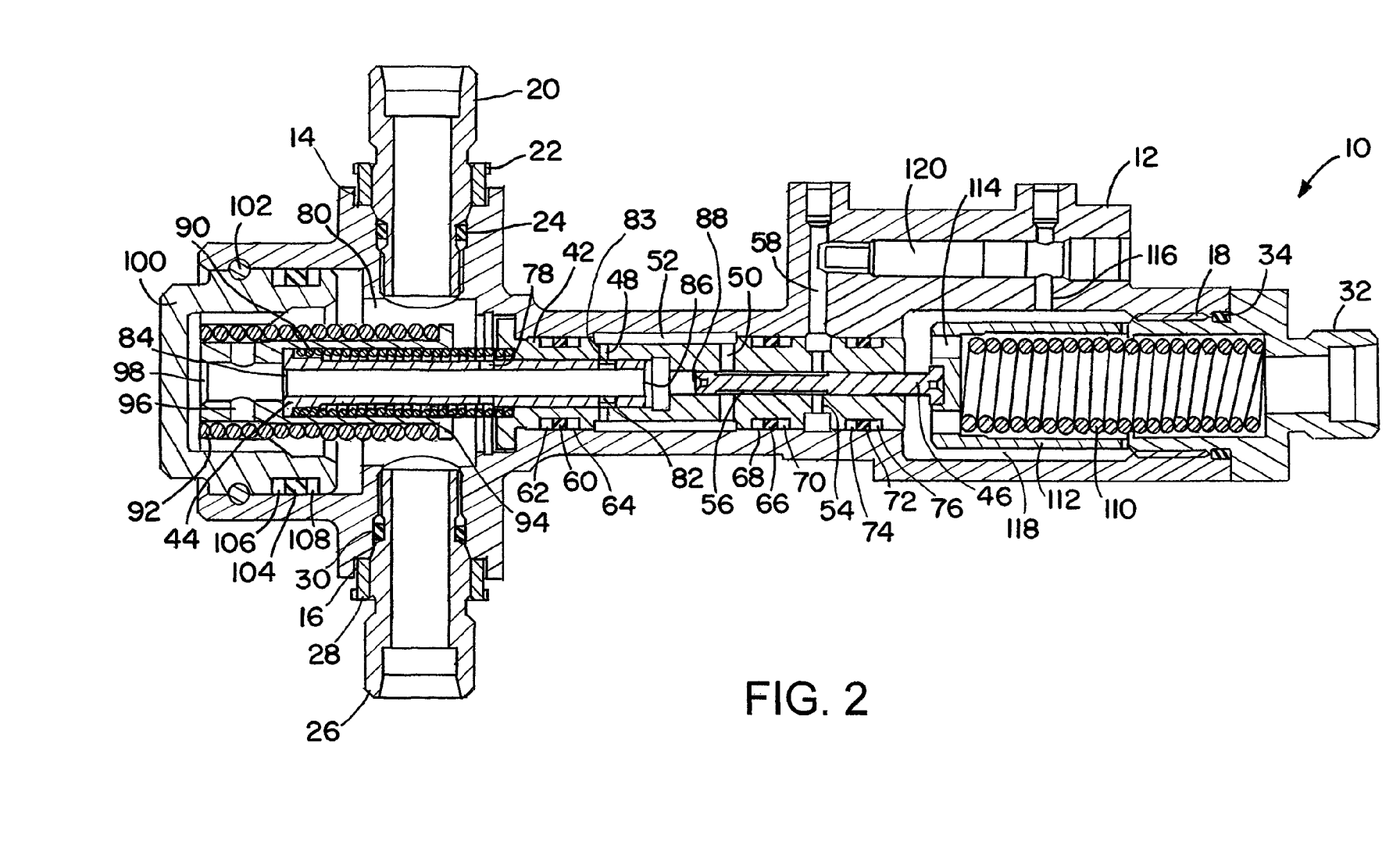
FIG. 2 is a cross-section view of the heater valve according to the invention, where the thermal spool is in the first position and the priority spool is in a second position.
Figure 3:
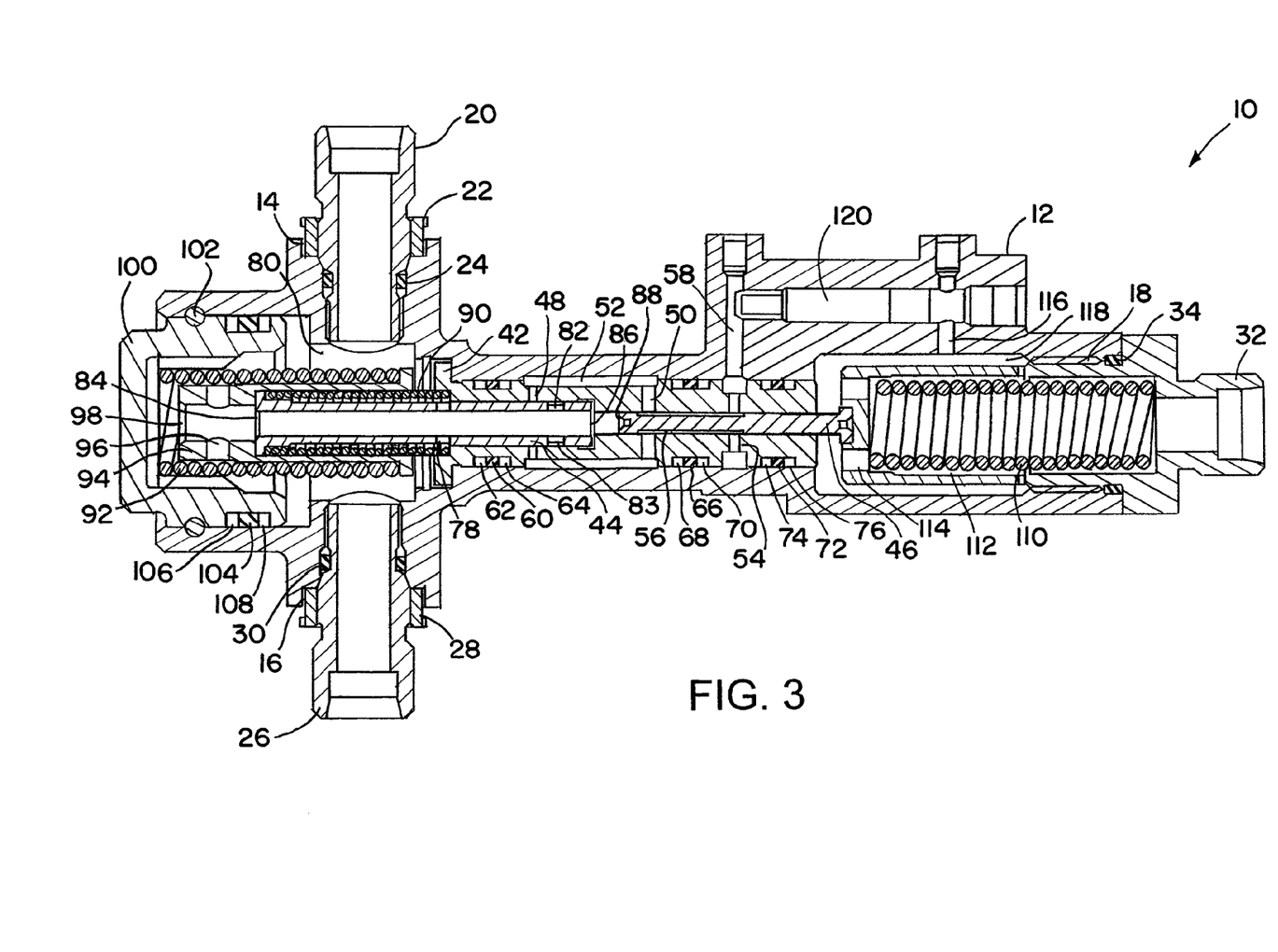
FIG. 3 is a cross-section view of the heater valve according to the invention, where the thermal spool is in a second position and the priority spool is in the second position.

When fluid is flowing through the valve 10 from the inlet port 20 towards the first outlet port 26, or from the first outlet port to the inlet port, the fluid flows over the thermal spool 44 and the thermal spring seat 94. Some of the fluid enters the spring seat 94 via openings 96 and opening 98 and the thermal spool 44 via the first openings 78 and the third opening 84, and some of the fluid flows out the first outlet port 26. The fluid in the thermal spool 44 and spring seat 94 flows towards the second openings 82 in the thermal spool 44. When the thermal spool is in the first position, as shown in FIGS. 1 and 2 as an open position, the openings 82 and annulus 83 are aligned with the first openings 48 in the sleeve 42. The fluid flows through the openings 48 towards the annulus 52 on an outside of the sleeve 42. The fluid flows along the annulus 52 and into the sleeve 42 via the second openings 50, and then through the sleeve along the annulus 56 on an outside of the priority spool 46. When the priority spool 46 is in a second position, as shown in FIGS. 2 and 3 as an open position, the fluid flows along the annulus 56 to the openings 54 in the sleeve 42. The openings 54 are in line with the flow passage 58 in the housing.

Turning now to the operation of the valve 10, FIG. 1 shows the thermal spool 44 in the first position and the priority spool 46 in the first position. The thermal spool 44 is in the first position when the temperature of the fluid is below a predetermined temperature, for example, less than twenty degrees Celsius, and the priority spool 46 is in the first position when the pressure of the fluid is below a predetermined pressure, for example, less than 250 bar. When the temperature is below the predetermined temperature, the spring force of the first spring 90 is greater than the spring force of the second spring 92, thereby causing the thermal spool 44 to be shifted to the first position by the first spring 90.

As mentioned above, as the fluid flows over thermal spool 44, spring seat 94, and first and second springs 90 and 92, some of the fluid enters the thermal spool 44 and spring seat 94 via the openings 78, 84, 96 and 98. The fluid flows towards the second end of the thermal spool 44 and exits the spool via openings 82 and the annulus 83, which are aligned with the first openings 48 in the sleeve 42. The fluid flows from the first openings 48 to the annulus 52 and then along the annulus to the second openings 50 in the sleeve 42. The fluid then flows from the openings 50 to the annulus 56 on the priority spool 46 and along the annulus. However, because the pressure of the fluid is below the predetermined pressure, the priority spool 46 is in the first position and the annulus 56 is not aligned with the openings 54 in the sleeve. Therefore, the fluid does not enter the flow passage 58 and only exits the valve 10 via the first outlet port 26.

Turning now to the operation of the valve 10 shown in FIG. 2, the thermal spool 44 is shown in the first position and the priority spool 46 is shown in the second position. The priority spool 46 is in the second position when the pressure of the fluid is above the predetermined pressure, for example, greater than 250 bar. The priority spool 46 is moved to the second position by the fluid flowing through the bore 86 of the thermal spool 44. When the pressure of the fluid entering the valve 10 is above the predetermined pressure, the pressure of the fluid flowing through the bore 86 acts on the end face 88 to shift the priority spool 46 towards the second outlet port 32 to the second position so that the annulus 56 is aligned with the openings 54. The priority spool 46 therefore overcomes the spring force of the spring 110 that is biasing the priority spool 46 in the first position, and the fluid flows from the openings 54 to the flow passage 58.

The fluid then flows from the flow passage 58 to a heating orifice 120, where the fluid will increase in temperature and experience a pressure drop. The now low pressure, high temperature fluid exits the heating orifice 120 and flows to the flow passage 116 and then to the passage 118. The fluid enters the passage 118 and flows around the priority spring seat 112 and into the spring seat via openings 114 on the first end of the spring seat. The fluid then flows through the spring seat 112 and out the second outlet port 32 to a fluid reservoir. Accordingly, as shown in FIG. 2, fluid having a temperature below the predetermined temperature and a pressure above the predetermined pressure flows out the first outlet port 26, while fluid having a temperature above the predetermined temperature and a pressure below the predetermined pressure flows out the second outlet port 32. In this way, high temperature fluid can be returned to the reservoir via the second outlet port so that when the fluid is re-circulated through the valve 10, the fluid has a higher temperature and therefore prevents or reduces pressure drops downstream of the valve 10. With pressure drops being prevented or reduced, smaller hydraulic lines may be used in the airplane, thereby reducing the weight of the airplane. Moreover, because the fluid flowing through the lines will be at a higher temperature, the valve allows for faster response of flight control actuators on the aircraft.

Turning now to FIG. 3, the thermal spool 44 is shown in a second position and the priority spool 46 is shown in the second position. The thermal spool 44 is in the second position, which as shown is a closed position, when the temperature of the fluid is above the predetermined temperature, for example, greater than thirty degrees Celsius. If the thermal spool is configured to be in the first position at a first temperature and a second position at a second temperature (for example, if the thermal spool is in the first position at a temperature less than twenty degrees Celsius and the second position at a temperature greater than thirty degrees Celsius), the thermal spool may be in a partially open/closed position between the two temperatures.

As the fluid at a temperature above the predetermined temperature flows over the first and second springs 90 and 92, the second spring 92 reacts to the temperature of the fluid and the spring force of the second spring 92 increases to a spring force greater than the spring force of the first spring 90. The second spring 92 then shifts the thermal spool 44 to the second position towards the priority spool 46. In the second position, the second openings 82 and annulus 83 in the thermal spool 44 no longer are aligned with the openings 50 in the sleeve 42. Therefore, even though the pressure of the fluid is above the predetermined pressure, resulting in the priority spool 46 being in the second position so that the annulus 56 is aligned with the openings 54, the fluid does not flow to the annulus 56. Accordingly, the fluid does not enter the flow passage 58 and therefore only exits the valve 10 via the first outlet port 26.

Figure 4:
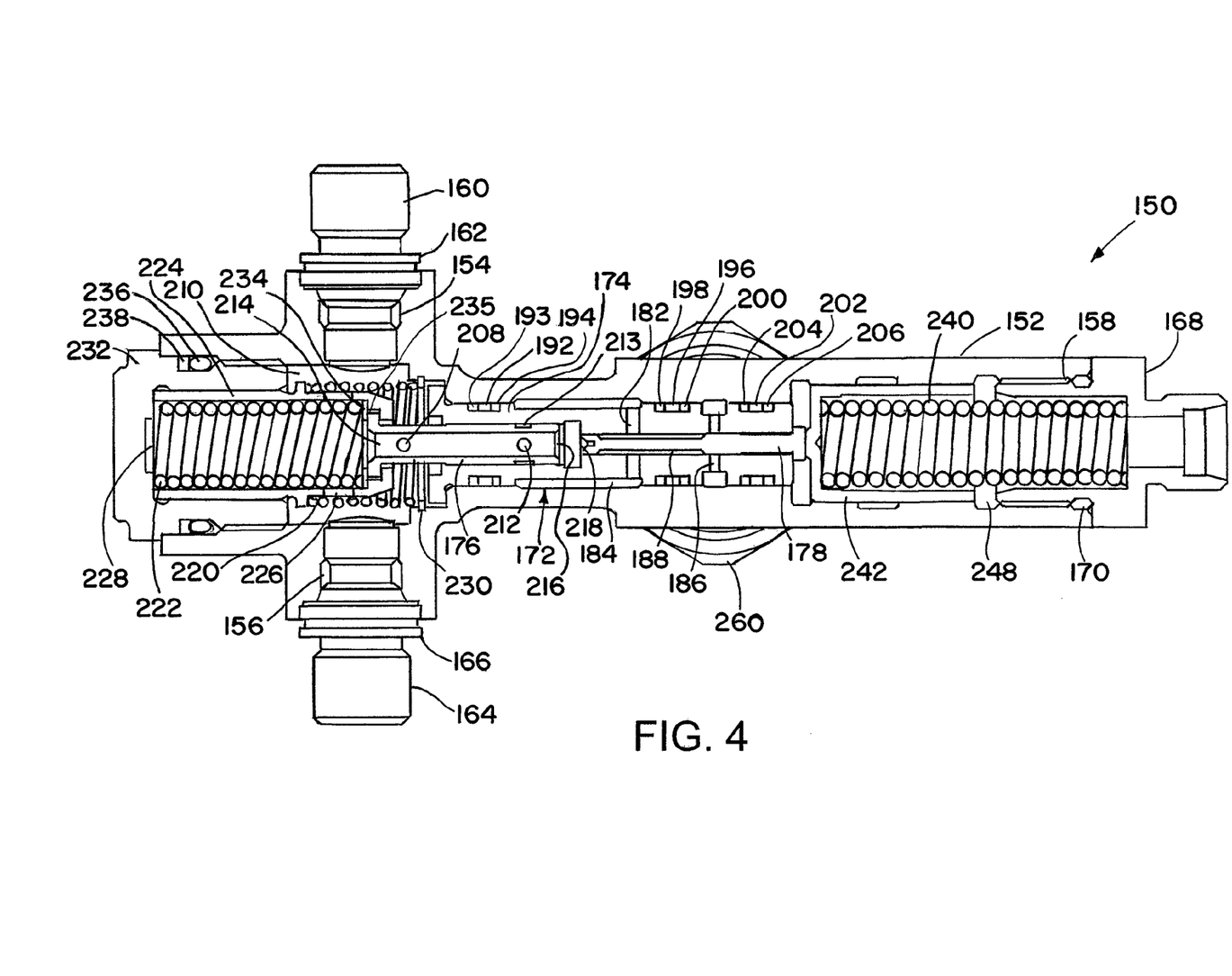
FIG. 4 is a cross-sectional view of another heater valve according to the invention, where a thermal spool and a priority spool are both in a first position.
Figures 5, 6:
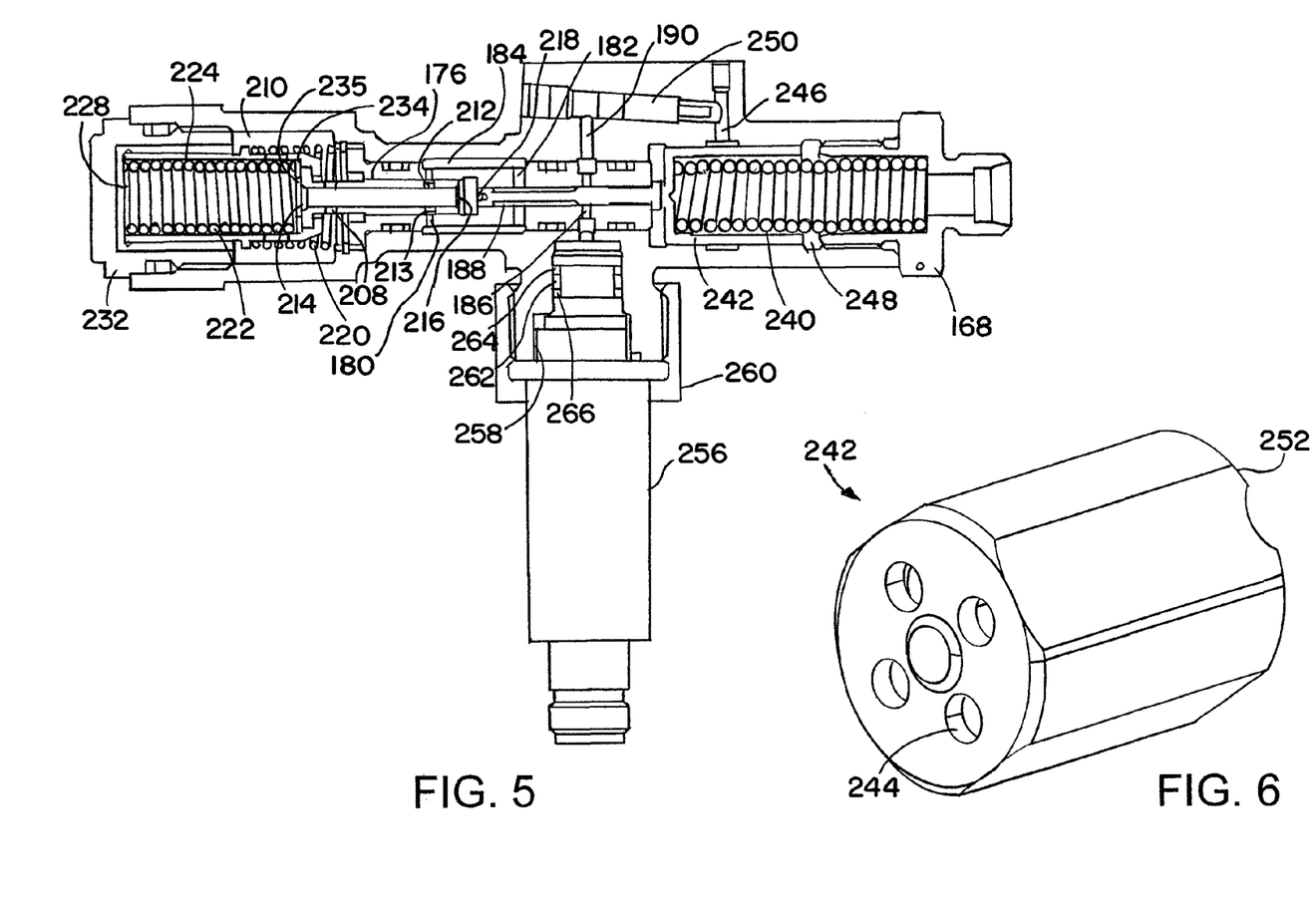
FIG. 5 is another cross-sectional view of the heater valve of FIG. 4.
FIG. 6 is a perspective view of an exemplary priority spring seat according to the invention.

Referring now to FIGS. 4 and 5, another embodiment of the heater valve according to the invention is indicated generally by reference numeral 150. The heater valve 150 is substantially the same as the above-referenced heater valve 10, and accordingly, the foregoing description of the heater valve 10 is equally applicable to the heater valve 150 except as noted below.

The heater valve includes a housing 152 having an inlet 154, a first outlet 156 and a second outlet 158. The inlet 154 is configured to receive an inlet port 160, which is secured to the housing by any suitable means, such as by threads, and sealed by a suitable seal. It will be appreciated, however, that the inlet port may be formed integrally with the housing. A locking ring 162 disposed around the inlet port 160, and the locking ring may be secured to the housing by any suitable means, such as by threads. The first outlet 156 is configured to receive a first outlet port 164, which is secured to the housing by any suitable means, such as by threads, and sealed by a suitable seal. It will be appreciated, however, that the first outlet port may be formed integrally with the housing. A locking ring 166 disposed around the outlet port 164 is provided to prevent loosening of the outlet port, and the locking ring may be secured to the housing by any suitable means, such as by threads. The second outlet 158 is configured to receive a second outlet port 168, which is secured to the housing by any suitable means, such as by threads, and sealed by a suitable seal, such as o-ring 170. It will be appreciated, however, that the second outlet port may be formed integrally with the housing.

The valve 150 also includes sleeve 174, which may be integrally formed with the housing, a thermal valve member 176 and a priority valve member 178, the valve members being preferably in the form of spools guided in the sleeve and will herein be described as such. The sleeve 174 includes first openings 180 and second openings 182 connected by an annulus 184 and third openings 186 configured to communicate with an annulus 188 of the priority spool 178 and with a flow passage 190 in the housing. The sleeve 174 is sealed to an inner wall of the housing 150 by suitable seals, such as o-ring 192 and back-up rings 193 and 194 at an upstream end of the sleeve, o-ring 196 and back-up rings 198 and 200 downstream of o-ring 192, and o-ring 202 and back-up rings 204 and 206 downstream of o-ring 196. The thermal spool 176 includes first openings 208 communicating with a passage 210 between the inlet and the first outlet, second openings 212 communicating with an annulus 213 on an outside of the thermal spool that communicates with the first openings 180 in the sleeve 174 when the thermal spool is in a first position, and a third opening 214 for receiving fluid. The thermal spool 174 also includes a hollow bore 216 allowing fluid to flow through the thermal spool to contact a pressure surface 218 of the priority spool 178, which may be an end face. The pressure acting on the end face 218 can shift the priority spool 178 to a second position.

The thermal spool 176 is balanced by first and second springs 220 and 222, which oppose one another and which may be concentrically arranged. The first spring 220 may be any suitable spring, such as a corrosion-resistant steel spring and the second spring 222 may be any suitable spring responsive to temperature changes of the fluid flowing through the housing, such as a nickel titanium (nitinol) spring. Alternatively, the first spring or both the first and second springs may be nickel titanium springs responsive to different temperatures.

The first spring 220 surrounds a thermal spring seat 224, which has openings 226 and an opening 228 on a first end for receiving fluid. The spring 220 is interposed between lip of the spring seat 224 and a retaining ring 230. The retainer ring 230 has an opening through which the thermal spool is inserted and is disposed upstream of the lip of the spring seat 224 and adjacent a first end of the sleeve 174. The second spring 222 is interposed between an end wall of a counterbore of a cap 232 and a washer 234 disposed on an end wall of a counterbore of the spring seat 224. The washer has an opening 235 through which fluid flows and the thermal spool 178 is mechanically interlocked into the sleeve 174 via the washer 234. When the valve 150 is assembled, the sleeve 174 and priority spool 178 are inserted into the valve housing 152 on a first side of the housing. Alternatively, the priority spool can be inserted from a second side of the housing. The retaining ring 230 and the first spring 220 are then inserted into the housing. The thermal spool 176 and washer 234 are inserted into the spring seat 224, before being inserted into the housing, and the spring seat 224 is inserted so that the lip on the spring seat abuts the first end of the spring 220. The second spring 222 can then be inserted into the spring seat, or alternatively already be disposed in the spring seat, and the cap 232 secured to the housing 152 by any suitable means, such as threads. The cap 232 is sealed to an inner wall of the housing 152 by suitable seals, such as o-ring 236 and back-up ring 238.

The valve 150 also includes a third spring 240 biasing the priority spool in a first position, which as illustrated is a closed position. The spring 240 may be any suitable spring, such as a corrosion-resistant steel spring or a nickel titanium spring. The spring 240 is interposed between an end wall of a counterbore of a priority spring seat 242 and an end wall of a counterbore of the second outlet port 168. The spring seat 242 includes openings 244 (FIG. 6) on a first end for receiving fluid that flows from a passage 246 to a passage 248 in the housing.

When fluid is flowing through the valve 150 from the inlet port 160 towards the first outlet port 164, or from the first outlet port to the inlet port, the fluid flows over the thermal spool 176 and the thermal spring seat 224. Some of the fluid enters the spring seat 224 via openings 226 and opening 228 and the thermal spool 176 via the first openings 208 and the third opening 214. The fluid in the thermal spool 176 and spring seat 224 flows towards the second openings 212 in the thermal spool. When the thermal spool 176 is in the first position, as shown in FIGS. 4 and 5 as an open position, the openings 212 and annulus 213 are aligned with the first openings 180 in the sleeve 174. The fluid flows through the openings 180 towards the annulus 184 on an outside of the sleeve 174. The fluid flows along the annulus 184 and into the sleeve 174 via the second openings 182, and then though the sleeve along the annulus 188 on an outside of the priority spool 178.

When the priority spool 178 is in a second position, which is an open position similar to FIGS. 2 and 3, the fluid flows along the annulus 188 to the openings 186 in the sleeve 174 and then to the flow passage 190 and out the second outlet 168. The priority spool is moved to the second position by the fluid flowing through the bore 216 of the thermal spool. When the pressure of the fluid entering the valve 150 is above the predetermined pressure, the pressure of the fluid flowing through the bore 216 acts on the end face 218 of the priority spool 178 to shift the priority spool to the second position so that the annulus 188 is aligned with the openings 186. The fluid then flows from the flow passage 190 to a heating orifice 250, where the fluid will increase in temperature and experience a pressure drop. The low pressure, high temperature fluid exiting the heating orifice then flows to the flow passage 246 that communicates with the passage 248 in the housing 152. The fluid enters the passage 248 and flows around the priority spring seat 242 via grooves 252, shown in FIG. 6, on an outer surface of the spring seat. The fluid can flow into the spring seat via openings 244, shown in FIG. 6, on a first end of the spring seat, and can also flow along the grooves 252 towards the second outlet port 168. The fluid then flow around and through the spring seat 242, and out of the second outlet port 168 to a fluid reservoir. Accordingly, the fluid flows out of the valve 150 via both outlet ports 164 and 168.

As best shown in FIG. 5, the heater valve 150 also includes a pressure sensor 256, which may be a pressure switch. The pressure sensor is provided to sense the pressure in a passage downstream of the thermal valve. The pressure sensor can therefore determine when both the thermal spool 176 and the priority spool 178 are open to detect when the heater valve 150 is heating fluid and when the valve is not heating fluid. The housing includes an opening 258 configured to receive a first end of the pressure sensor 256. The pressure sensor is held in place by a collar 260 and sealed by suitable seals, such as o-ring 262 and back-up rings 264 and 266. The collar 260 is secured to the housing by any suitable means, such as by threads. A second end of the pressure switch is configured to be coupled to the aircraft so that the pressure switch can be connected to an aircraft signal wire.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A valve assembly including:
   a housing having an inlet for receiving fluid and first and second outlets for delivering the fluid from the valve assembly;
   thermal and priority valve members shiftable in the housing; and
   a sleeve disposed in the housing that guides the thermal and priority valve members;
   wherein the thermal valve member is shiftable by first and second springs between a first position permitting fluid flow from the inlet to the priority valve member and a second position blocking fluid flow, at least one of the springs being responsive to temperature changes of fluid flowing through the housing,
   wherein the priority valve member is shiftable against a biasing force by pressure at the inlet above a predetermined pressure, the priority valve member being shift- able between a first position blocking flow from the inlet to the second outlet and a second position permitting flow, and wherein the sleeve includes a first opening for receiving fluid from the thermal valve member when the thermal valve member is in the first position, a second opening communicating with the first opening, a third opening communicating with the second opening, and an annulus communicating with the first and second openings.

2. A valve assembly according to claim 1, wherein the first and second springs shift the thermal valve member to the first position when a temperature of the fluid is below a predetermined temperature and to the second position when the temperature of the fluid is above the predetermined temperature.

3. A valve assembly according to claim 1, wherein the priority valve member is shifted to the first position when the pressure of the fluid is below the predetermined pressure and to the second position when the pressure of the fluid is above the predetermined pressure.

4. A valve assembly according to claim 1, wherein the thermal valve member has a bore allowing fluid to flow through the thermal valve member to act on an end face of the priority valve member to shift the priority valve member to the second position.

5. A valve assembly according to claim 1, further including a third spring for effecting the biasing force on the priority valve member.

6. A valve assembly according to claim 5, wherein the third spring is seated against a priority spring seat, and wherein movement of the priority valve member to the second position shifts the spring seat from a first position to a second position to allow the fluid to flow to the second outlet.

7. A valve assembly according to claim 1, wherein the thermal valve member includes a first opening for receiving fluid and a second opening for delivering fluid to the first opening in the sleeve when the thermal valve member is in the first position.

8. A valve assembly according to claim 1, wherein the priority valve member includes an annulus communicating with the second and third openings in the sleeve when the priority valve member is in the second position.

9. A valve assembly according to claim 1, further including a heating orifice disposed between the inlet and the second outlet, wherein fluid passing through the heating orifice will increase in temperature.

10. A valve assembly according to claim 1, wherein the thermal and priority valve members are axially shiftable spools.

11. A valve assembly according to claim 1, wherein the at least one spring responsive to temperature change has a spring force that increases when the fluid temperature is above the predetermined temperature to overcome a spring force of the other spring to shift the thermal valve member to the second position.

12. A valve assembly according to claim 1, wherein the at least one spring responsive to temperature changes of the fluid is a nickel titanium spring.

13. A valve assembly according to claim 1, wherein the first and second springs are concentric.

14. A valve assembly according to claim 1, wherein the first and second springs are in a path of the fluid from the inlet to the first outlet.

15. A valve assembly according to claim 1, further including a pressure sensor for sensing pressure in a passage downstream of the thermal valve member.

16. A valve assembly according to claim 1, wherein the thermal valve member and the priority valve member are coaxial.

* * * * *